(12) United States Patent
Min

(10) Patent No.: US 8,857,901 B2
(45) Date of Patent: Oct. 14, 2014

(54) FRONT END MODULE FOR VEHICLE

(71) Applicant: Kia Motors Corporation, Seoul (KR)

(72) Inventor: Huen Sick Min, Gyeonggi-do (KR)

(73) Assignee: Kia Motors Corporation, Seoul (KR)

( * ) Notice: Subject to any disclaimer, the term of this patent is extended or adjusted under 35 U.S.C. 154(b) by 0 days.

(21) Appl. No.: 13/794,184

(22) Filed: Mar. 11, 2013

(65) Prior Publication Data

US 2014/0175837 A1    Jun. 26, 2014

(30) Foreign Application Priority Data

Dec. 24, 2012    (KR) ........................ 10-2012-0152015

(51) Int. Cl.
*B60N 99/00* (2006.01)
*B62D 25/12* (2006.01)

(52) U.S. Cl.
CPC .................................... *B62D 25/12* (2013.01)
USPC .................................................... 296/193.09

(58) Field of Classification Search
CPC .............................. B62D 25/085; B60R 21/23
USPC .......................... 296/193.09, 193.11, 203.02
See application file for complete search history.

(56) References Cited

U.S. PATENT DOCUMENTS

| | | | |
|---|---|---|---|
| 6,450,276 B1 * | 9/2002 | Latcau ........................ | 180/68.4 |
| 6,502,653 B1 * | 1/2003 | Balzer et al. ................ | 180/68.4 |
| 7,377,579 B2 * | 5/2008 | Kwon ....................... | 296/193.09 |
| 7,419,208 B2 * | 9/2008 | Sub ........................... | 296/193.09 |
| 7,618,087 B2 * | 11/2009 | Hedderly ................. | 296/203.02 |
| 8,196,978 B2 * | 6/2012 | Shin .............................. | 293/115 |
| 2004/0113459 A1 * | 6/2004 | Mattsson et al. ......... | 296/187.04 |
| 2005/0156447 A1 * | 7/2005 | Bishop et al. .................. | 296/76 |
| 2005/0253419 A1 * | 11/2005 | Kwon ...................... | 296/193.09 |
| 2006/0237999 A1 | 10/2006 | Sasaki | |
| 2011/0037292 A1 * | 2/2011 | Owen et al. .............. | 296/193.09 |

FOREIGN PATENT DOCUMENTS

| | | |
|---|---|---|
| KR | 10-2005-0029841 A | 3/2005 |
| KR | 1020060004186 A | 1/2006 |
| KR | 100802772 B1 | 2/2008 |
| KR | 10-2011-0050040 A | 5/2011 |
| KR | 10-2011-0093125 A | 8/2011 |

* cited by examiner

*Primary Examiner* — Lori Lyjak
(74) *Attorney, Agent, or Firm* — McDermott Will & Emery LLP

(57) ABSTRACT

A front end module of a vehicle includes an outer member having a front and a rear which define an internal space; an inner member having a bottom and a front which define the internal space between the outer member and the inner member; a hood latch mounted on the rear of the outer member; and a safety strike disposed in the internal space. Since the safety strike is disposed in the internal space inside the front end module, a shock-absorbing space is defined ahead of the front end module. A shock that is transferred through the hood absorbed by the shock-absorbing space in a collision with a pedestrian. As a result, the safety of a pedestrian can be enhanced in a collision with the pedestrian.

6 Claims, 4 Drawing Sheets

FRONT END MODULE FOR VEHICLE

CROSS-REFERENCE TO RELATED APPLICATION

This application claims priority to Korean Patent Application No. 10-2012-0152015, filed on Dec. 24, 2012 in the Korean Intellectual Property Office, the entirety of which is incorporated herein by reference.

BACKGROUND OF THE INVENTION

1. Field of the invention

The present disclosure relates to a front end module for a vehicle, and more particularly, to a front end module of a vehicle which has improved performance of protecting a pedestrian by absorbing a shock during a collision with the pedestrian.

2. Background

Generally, a front end module of a vehicle is equipped with a safety hook and a hood latch that lock/unlock a hood for opening/closing an engine room. It is important in designing the front end modules to make a space that can absorb a shock of a pedestrian during a collision with the pedestrian.

A front end module 20 for a vehicle in the related art, as shown in FIG. 1, has a closed space defined by an outer member 21 and an inner member 22 at the upper portion. Further, a hood latch 10 is mounted on the outer member 21 behind the front end module 20 such that a space that can absorb a shock during a collision with a pedestrian is provided. The space prevents the shock from being directly transferred from the pedestrian to the hood latch 10.

In the structure of the front end module 20 of a vehicle in the related art, however, as shown in FIG. 1, a safety strike 30 is mounted ahead of the inner member 22 and locked by a safety hook 31 mounted on a hood 40.

When a shock is transmitted to the front of the hood 40 by a collision of a vehicle with a pedestrian, as shown in FIG. 1, the hood latch 10 cannot sufficiently absorb a shock due to the safety strike 30 disposed ahead, even though the front end module 20 is disposed behind. A need exists for improving shock absorbing in the front end module of a vehicle.

SUMMARY OF THE INVENTION

Accordingly, the present disclosure has been made to solve the above-mentioned problems occurring in the prior art while advantages achieved by the prior art are maintained intact.

One aspect of the present disclosure provides a front end module for a vehicle which can sufficiently absorb a shock that is transferred from a hood in a collision with a pedestrian, by providing a sufficient shock-absorbing space ahead of a front end module, and by mounting a hood latch behind the front end module and mounting a safety strike inside the front end module.

Another aspect of the present disclosure encompasses a front end module for a vehicle including: an outer member having a top and a rear which define an internal space; an inner member having a bottom and a front which define the internal space between the outer member and the inner member; a hood latch mounted on the rear of the outer member; and a safety strike disposed in the internal space.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF THE PREFERRED EMBODIMENTS

Figure 1:
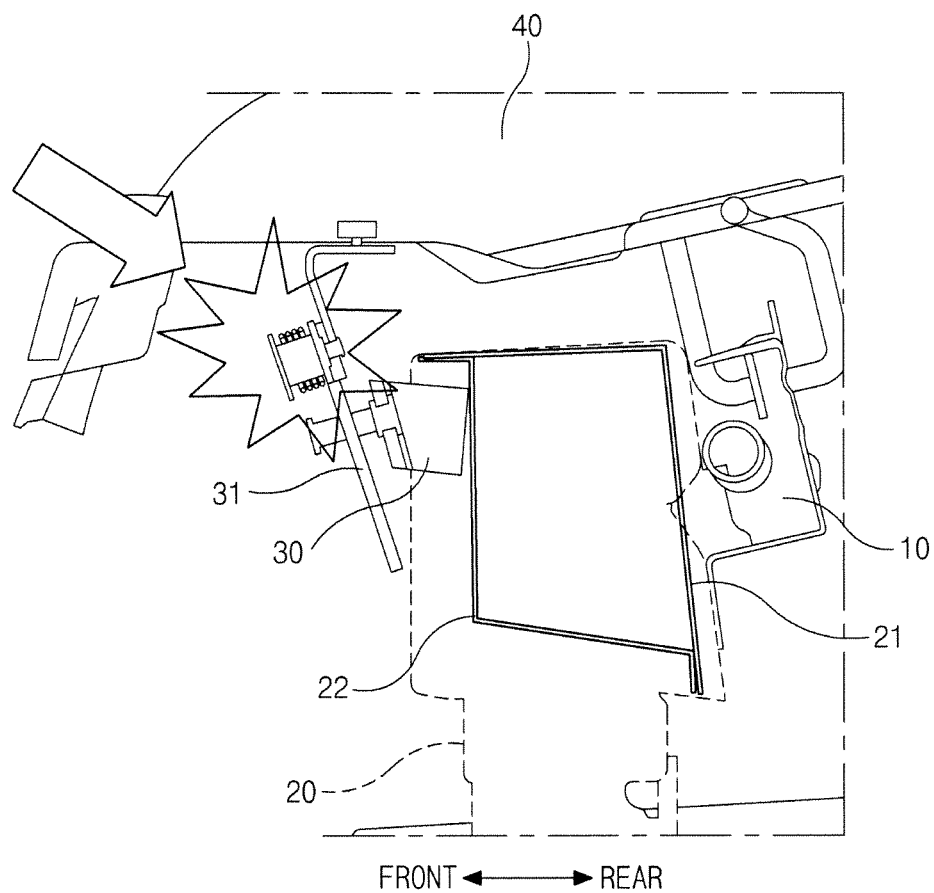
FIG. 1 is a view showing a front end module of a vehicle of the related art.
Figure 2:
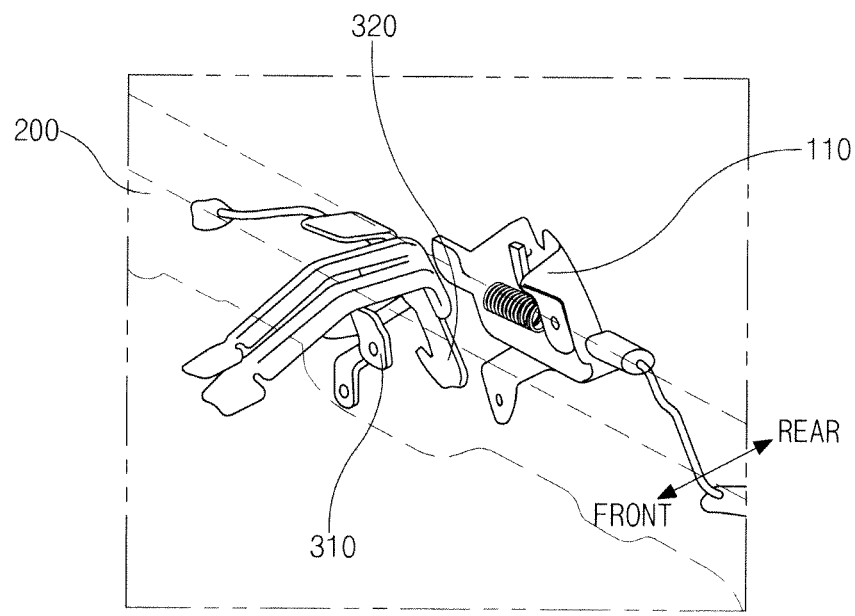
FIG. 2 is a view showing a front end module of a vehicle according to an example of the present disclosure.

Hereinafter, a front end module of a vehicle according to examples of the present disclosure will be described in detail with reference to the accompanying drawings. FIG. 2 is a view showing a front end module of a vehicle according to an example of the present disclosure, FIG. 3 is a cross-sectional view showing the front end module of a vehicle according to an example of the present disclosure, and FIG. 4 is an exploded view showing the front end module of a vehicle according to an example of the present disclosure.

Figure 3:
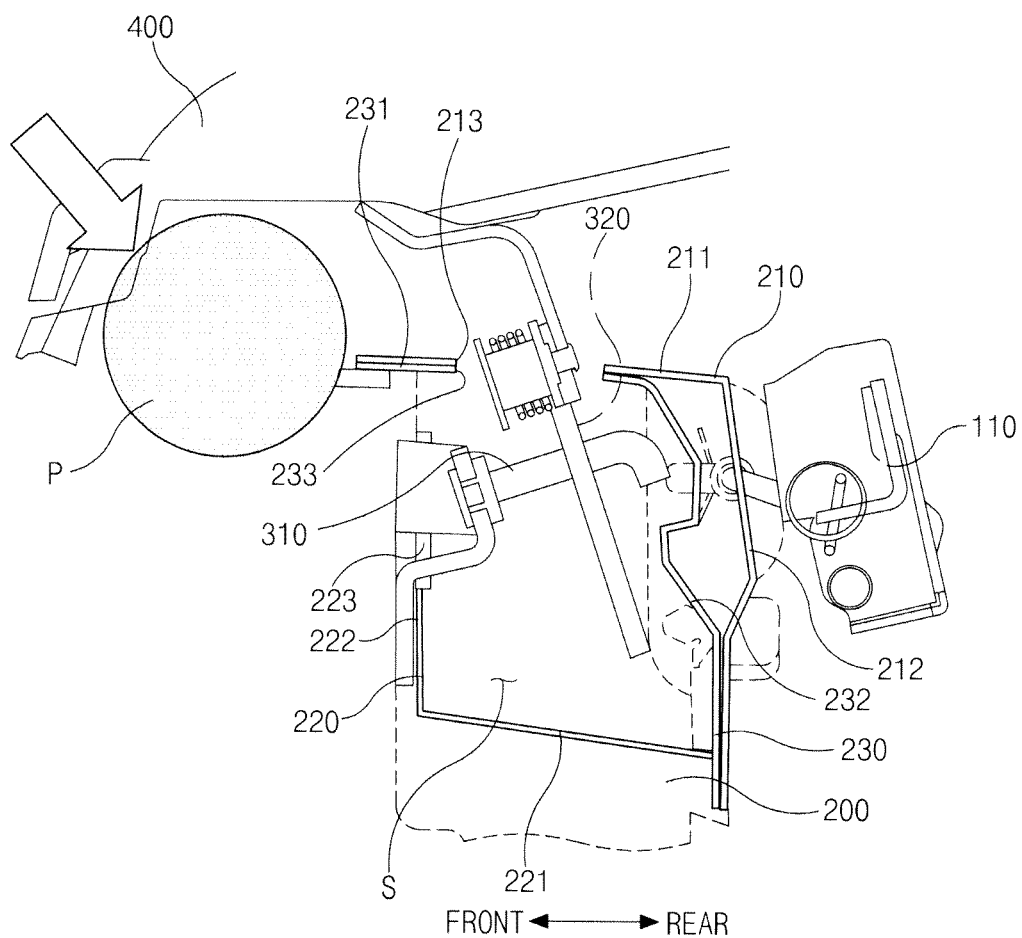
FIG. 3 is a cross-sectional view showing the front end module for a vehicle according to an example of the present disclosure.

The terms 'front', 'ahead', 'rear', 'behind' used in describing the present invention are defined under the 'front' and 'rear' taking the direction of arrows in FIGS. 2 and 3.

Figure 4:
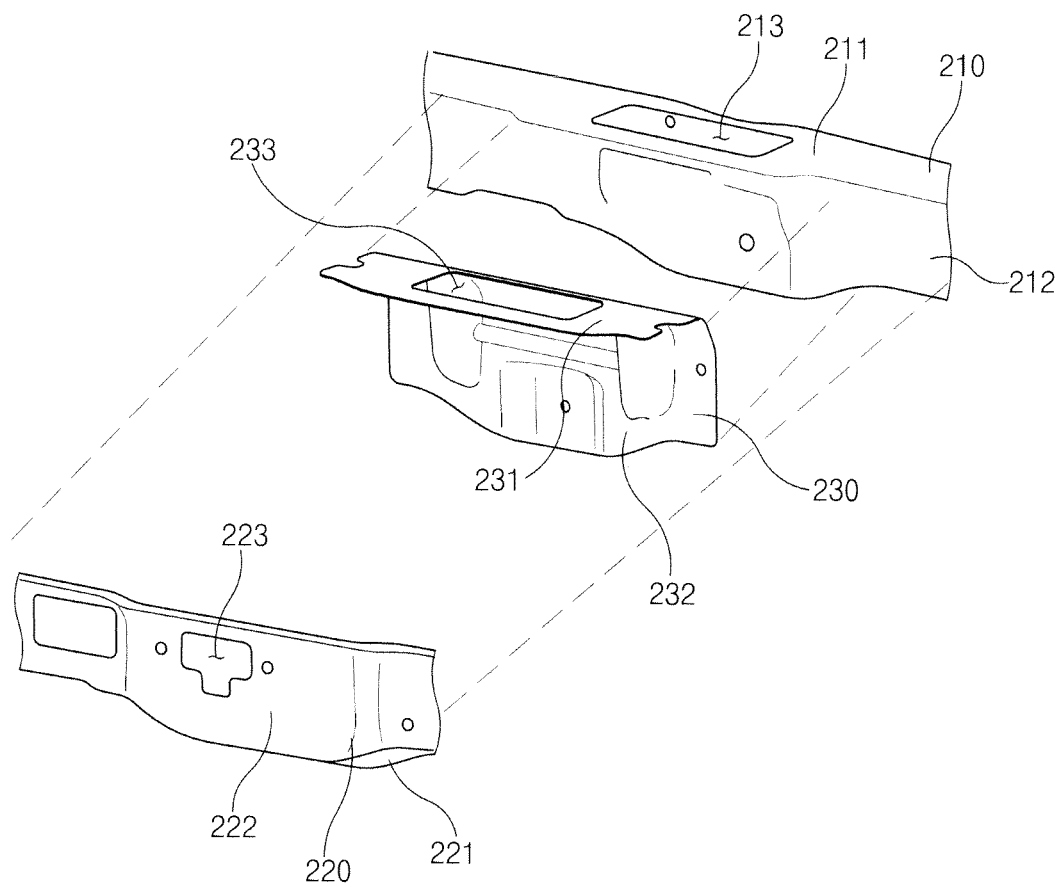
FIG. 4 is an exploded view showing the front end module for a vehicle according to an example of the present disclosure.

Referring to FIGS. 2 to 4, a front end module 200 is a structure that is mounted at the front part of a vehicle and to which a hood latch 110 and a safety strike 310 which lock/unlock a hood 400 are mounted.

An internal space S is provided inside the front end module 200. The internal space S is defined by an outer member 210 and an inner member 220. In detail, the outer member 210 has a top 211 at the upper portion and a rear 212 bending rearward and downward from the top 211. Further, the top 211 and the rear 212 define the top at the upper portion and the rear of the front end module 200. The inner member 220 has a front 222 positioned ahead and a bottom 221 bending rearward from the front 222. Further, the front 222 also defines the front at the upper portion of the front end module 200.

The top 211 of the outer member 210 and the front 222 of the inner member 220 are connected and the rear 212 of the outer member 210 and the bottom 221 are connected, such that the internal space S is formed with a closed cross-section, as shown in FIG. 3.

As shown in FIGS. 2 and 3, a hood latch 110 is mounted outside the rear 212 of the outer member 210. The hood latch 110 opens/closes a hood 400 by allowing a hood strike (not shown) mounted on the hood 400 to be locked/unlocked.

A safety strike 310 is disposed in the internal space S defined by the outer member 210 and the inner member 220. In detail, the safety strike 310 is fixed to the front 222 of the inner member 220 defining the internal space S and inserted and received in the internal space S. Referring to FIGS. 3 and 4, a mounting hole 223, in which the safety strike 310 is inserted, is formed at the front 222 of the inner member 220. The safety strike 310 is locked/unlocked by locking/unlocking the safety hook 320 mounted on the hood 400.

The safety hook 320 needs to be inserted into or separated from the internal space S in order to be locked to the safety strike 310 in the internal space S. To this end, a through-hole 213 is formed at the top 211 of the outer member 210, as shown in FIGS. 3 and 4.

Further, the front end module 200 may decrease in rigidity in comparison to that of the related art, due to the through-hole 213 formed at the outer member 210 and the mounting hole 223 formed at the inner member 220. Therefore, a reinforcing member 230 that divides a section of the internal space S of the front end module 200 reinforces the reduced rigidity in the example.

In detail, the reinforcing member 230, as shown in FIGS. 3 and 4, is disposed between the outer member 210 and the inner member 220, dividing the internal space S into two spaces. The safety strike 310 is disposed in the front one of the two divided spaces.

The reinforcing member 230 has a top 231 to be in surface-to-surface contact with the top of the outer member 210 and a rear 232 connected with the rear 232 of the outer member 210. The rear 232 of the reinforcing member 230 is spaced at the middle portion from the rear 232 of the outer member 210. Therefore, a space is defined between the reinforcing member 230 and the outer member 210 at the spaced middle portion. A through-hole 233 through which the safety hook 310 can pass is formed through the top 231 of the reinforcing member 230, at the same position of the through-hole 213 formed at the outer member 210.

As described above, since the reinforcing member 230 divides the cross-section of the internal space S between the outer member 210 and the inner member 220 into two parts and the top 231 is in surface-to-surface contact with the top 231 of the outer member 210, the rigidity of the front end module 200 increases. Therefore, it is possible to complement the rigidity decreased by the through-hole 213 formed at the outer member 210 and the mounting hole 223 formed at the inner member 220.

Hereinafter, the operation of the front end module 200 according to the example will be described with reference to the accompanying drawings.

Since the safety strike 310 is disposed in the internal space S inside the front end module 200 according to the example, a shock-absorbing space P is defined ahead of the front end module 200, as shown in FIG. 3. Therefore, a shock that is transferred through the hood 400 from a collision with a pedestrian is absorbed by the shock-absorbing space P. As a result, the safety of a pedestrian can be enhanced in a collision with the pedestrian.

Further, since the front end module 200 according to the example has the through-hole 213, and the safety hook 320 mounted on the hood 400 can pass through the through-hole 213, the safety hook 320 can be easily locked to the safety strike 310, through the top 211 of the outer member 210, in opening/closing of the hood 400.

Further, since the front end module 200 has the mounting hole 223, through which the safety strike 310 can be inserted, the safety strike 310 can be easily mounted through the front 222 of the inner member 220, which improves the assembly performance.

Further, since the front end module 200 according to the example has the reinforcing member 230 dividing the cross-section of the internal space S defined by the outer member 210 and the inner member 220 into two parts, the entire rigidity can be increased. In addition, since the top 231 of the reinforcing member 230 is in surface-to-surface contact with the top 211 of the outer member 210, the rigidity of the front end module 200 can be further increased.

Since the safety strike 310 is disposed in the internal space inside the front end module having the configuration of the present disclosure, a shock-absorbing space is defined ahead of the front end module. Therefore, a shock that is transferred through the hood is absorbed by the shock-absorbing space in a collision with a pedestrian. As a result, the safety of a pedestrian can be enhanced in a collision with the pedestrian.

Although examples of the present disclosure were described in detail above, the present disclosure is not limited thereto and may be modified in various ways without departing from the scope defined in claims.

What is claimed is:

1. A front end module for a vehicle, comprising:
    an outer member having a top and a rear which define an internal space;
    an inner member having a bottom and a front which define the internal space between the outer member and the inner member; and
    a hood latch mounted on the rear of the outer member; and
    a safety strike disposed in the internal space.

2. The front end module according to claim 1, wherein a through-hole, through which a safety hook locked to the safety strike passes, is disposed at the top of the outer member.

3. The front end module according to claim 1, wherein a mounting hole, into which the safety strike is inserted, is disposed at the front of the inner member.

4. The front end module according to any one of claims 1 to 3, wherein a reinforcing member dividing the cross-section of the internal space is disposed between the outer member and the inner member.

5. The front end module according to claim 4, wherein the top of the reinforcing member is in surface-to-surface contact with the top of the outer member.

6. The front end module according to claim 5, wherein a through-hole, through which a safety hook locked to the safety strike passes, is disposed at the top of the reinforcing member.

* * * * *